(12) United States Patent
Tachiwa

(10) Patent No.: US 10,264,434 B2
(45) Date of Patent: Apr. 16, 2019

(54) COMMUNICATION APPARATUS, METHOD FOR CONTROLLING THE SAME, AND PROGRAM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/705,130

(22) Filed: Sep. 14, 2017

(65) Prior Publication Data

US 2018/0084372 A1 Mar. 22, 2018

(30) Foreign Application Priority Data

Sep. 20, 2016 (JP) ................................ 2016-183359

(51) Int. Cl.
| | |
|---|---|
| *H04W 8/00* | (2009.01) |
| *H04W 4/80* | (2018.01) |
| *H04M 1/725* | (2006.01) |
| *H04N 5/232* | (2006.01) |
| *H04W 84/12* | (2009.01) |
| *H04W 88/06* | (2009.01) |

(Continued)

(52) U.S. Cl.
CPC .......... *H04W 4/80* (2018.02); *H04M 1/7253* (2013.01); *H04N 5/23206* (2013.01); *H04W 8/005* (2013.01); *H04L 67/06* (2013.01); *H04M 2250/02* (2013.01); *H04M 2250/06* (2013.01); *H04W 52/0254* (2013.01); *H04W 52/0274* (2013.01); *H04W 84/12* (2013.01); *H04W 88/06* (2013.01); *Y02D 70/10* (2018.01); *Y02D 70/14* (2018.01); *Y02D 70/142* (2018.01); *Y02D 70/144* (2018.01); *Y02D 70/166* (2018.01)

(58) Field of Classification Search
CPC .............................. H04W 76/40; H04W 48/10
USPC ...................................... 455/41.1, 41.2, 41.3
See application file for complete search history.

(56) References Cited

U.S. PATENT DOCUMENTS

| | | | |
|---|---|---|---|
| 2011/0183614 A1 | 7/2011 | Tamura | |
| 2013/0178163 A1* | 7/2013 | Wang | .................... H04W 48/10 455/41.2 |

(Continued)

OTHER PUBLICATIONS

Bluetooth Specification, Host Controller Interface Functional Specification, Dec. 2, 2014, pp. 387-1056, Version 4.2 [vol. 2, Part E].

(Continued)

*Primary Examiner* — Wen W Huang
(74) *Attorney, Agent, or Firm* — Canon U.S.A., Inc. IP Division

(57) ABSTRACT

A communication apparatus includes a first communication unit that performs communication conforming to Transport Discovery Service specifications based on Bluetooth low energy and a second communication unit that performs communication based on a non-Bluetooth low energy communication method, wherein, in a case where the communication apparatus is in a state in which communication with another communication apparatus based on non-Bluetooth low energy communication method is not performed, the first communication unit does not transmit an advertising packet or transmits an advertising packet in which a value of Transport State Bits is set to "Temporarily Unavailable".

14 Claims, 12 Drawing Sheets

(51) Int. Cl.
*H04L 29/08* (2006.01)
*H04W 52/02* (2009.01)

(56) References Cited

U.S. PATENT DOCUMENTS

| | | | | |
|---|---|---|---|---|
| 2013/0273851 | A1* | 10/2013 | Preiszler | H04W 4/008 455/41.2 |
| 2015/0103708 | A1* | 4/2015 | Kang | H04W 72/0433 370/311 |
| 2016/0037439 | A1* | 2/2016 | Shamis | H04W 48/16 370/329 |
| 2016/0088425 | A1* | 3/2016 | Goel | H04W 4/008 455/41.1 |
| 2016/0112947 | A1* | 4/2016 | Sahoo | H04W 28/0221 370/311 |
| 2016/0269577 | A1* | 9/2016 | Sato | H04N 1/00307 |
| 2016/0302060 | A1* | 10/2016 | Agardh | H04L 67/16 |
| 2016/0353233 | A1* | 12/2016 | Yong | H04W 4/008 |
| 2016/0353382 | A1* | 12/2016 | Xue | H04W 52/0251 |
| 2017/0215030 | A1* | 7/2017 | Choi | H04W 8/005 |

OTHER PUBLICATIONS

Bluetooth Specification, Generic Access Profile, Dec. 2, 2014, pp. 277-410, Version 4.2 [vol. 3, Part C].
Bluetooth Specification, Linklayer Specification, Dec. 2, 2014, pp. 26-119, Version 4.2 [vol. 6, Part B].
Bluetooth Specification, Message Sequence Charts, Dec. 2, 2014, pp. 129-164, Version 4.2 [vol. 6, Part D].

* cited by examiner

COMMUNICATION APPARATUS, METHOD FOR CONTROLLING THE SAME, AND PROGRAM

BACKGROUND

Field

The present disclosure relates to a communication apparatus, a method for controlling the communication apparatus, and a program.

Description of the Related Art

In recent years, there has been developed a communication apparatus supporting a plurality of wireless communication methods and changing a wireless communication method according to an application or in response to a request. Examples of a technique for changing a wireless communication method include a communication apparatus, using a wireless communication method before the changing, transmitting a request for starting communication based on a different wireless communication method to a different communication apparatus. Upon receipt of the request for starting communication, the different communication apparatus can start communication based on the different wireless communication method.

US Patent No. 2011/0183614 discusses a technique for transmitting a request for starting Bluetooth® communication via Near Field Communication (NFC). As a technique for changing a wireless communication method via Bluetooth, Transport Discovery Service (TDS) specifications are defined. The TDS standard defines a procedure for starting communication using another wireless communication method via Bluetooth low energy. When a communication apparatus operating in conformance with the TDS specifications receives a predetermined advertising packet while being ready for communication based on a different wireless communication method, the communication apparatus transmits a request for starting communication based on the different wireless communication method via Bluetooth low energy to the transmission source of the packet.

When performing high-speed wireless communication, such as wireless local area network (LAN) communication, the communication apparatus consumes a large amount of power and adds a large noise to the circuit in the apparatus, as to a case of a wireless communication performed via Bluetooth low energy. Thus, other functions sometimes cannot be used at the same time as the high-speed wireless communication. For example, some cameras with a wireless LAN communication function temporarily disable the wireless LAN communication function during image capturing. When such a camera receives a request for performing wireless LAN communication from another apparatus during image capturing, the camera cannot start wireless LAN communication.

Transmitting a request for starting wireless LAN communication through a procedure conforming to the TDS specifications requires advance preparation processing for establishing a Bluetooth low energy connection. If the request is, the advance preparation processing becomes useless. A communication apparatus using the Bluetooth low energy communication method, which is a low power consumption method, operates on battery in many cases. In such a communication apparatus, useless processing shortens the operation time between charges. This tends to reduce user convenience.

What is needed is a communication apparatus, which changes a communication method to a different communication method causes another apparatus not to issue a request for starting the different communication method that has been unavailable in the communication apparatus.

SUMMARY OF THE INVENTION

According to an aspect of the present disclosure, a communication apparatus includes a first communication unit configured to perform communication conforming to Transport Discovery Service specifications based on Bluetooth low energy, and a second communication unit configured to perform communication based on a non-Bluetooth low energy communication method, wherein, in a case where the communication apparatus is in a state in which communication with a different communication apparatus based on the non-Bluetooth low energy communication method is not performed, the first communication unit does not transmit an advertising packet or transmits an advertising packet in which a value of Transport State Bits is set to "Temporarily Unavailable".

Additional features will become apparent from the following description of exemplary embodiments with reference to the attached drawings.

DESCRIPTION OF THE EMBODIMENTS

Figure 1:
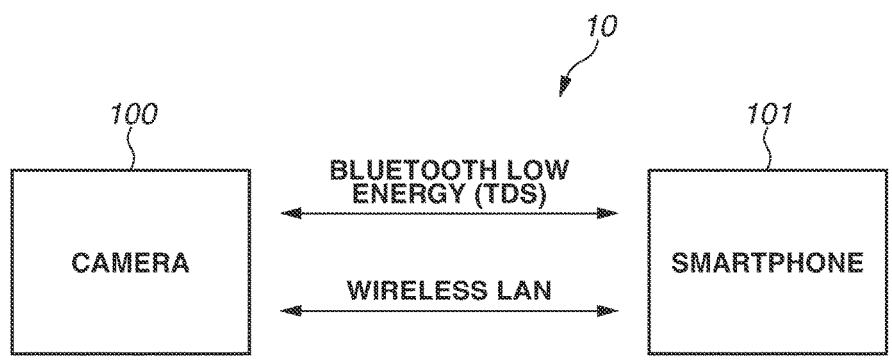
FIG. 1 illustrates a configuration of a communication system according to an exemplary embodiment.

A configuration of a communication system 10 according to a first exemplary embodiment is illustrated in FIG. 1. The communication system 10 includes a camera 100 and a smartphone 101. When the camera 100 and the smartphone 101 are in proximity to each other, the camera 100 automatically transmits captured images to the smartphone 101. Thus, a user can browse these images on the smartphone 101. Both the camera 100 and the smartphone 101 operate on battery and can perform communication with each other via wireless LAN communication conforming to Bluetooth low energy and IEEE 802.11 series. The camera 100 and the smartphone 101 can perform communication via other wireless communication methods instead of wireless LAN communication. Other wireless communication methods include, for example, wireless communication methods based on Bluetooth® Basic Rate/Enhanced Data Rate (BR/EDR), public radio, millimeter wave, and visible light. When the camera 100 detects that the smartphone 101 is in proximity via Bluetooth low energy, the camera 100 transmits image data via wireless LAN communication. To save the battery, the camera 100 turns OFF a wireless LAN communication function at the time other than image data transmission. The smartphone 101 also performs similar control for turning the wireless LAN communication function ON and OFF.

A procedure for proximity detection via Bluetooth low energy will be described below. The camera 100 and the smartphone 101 are communication apparatuses that operate in conformance with the Transport Discovery Service (TDS) specifications. The smartphone 101 is constantly ready for receiving an advertising packet defined by the Bluetooth low energy specifications. When the smartphone 101 receives a predetermined advertising packet (described with reference to FIG. 3) transmitted by the camera 100, the smartphone 101 transmits a request for starting wireless LAN communication to the camera 100 via Bluetooth low energy. More specifically, when the smartphone 101 is in proximity, i.e., within a range where an advertising packet of the camera 100 reaches, the smartphone 101 can transmit a request for starting wireless LAN communication to the camera 100. The smartphone 101 can determine whether an advertising packet is received and also perform proximity detection based on the received radio wave intensity. Hereinafter, a request for starting wireless LAN communication (connection) is referred to as a wireless LAN connection start request.

Figure 3:
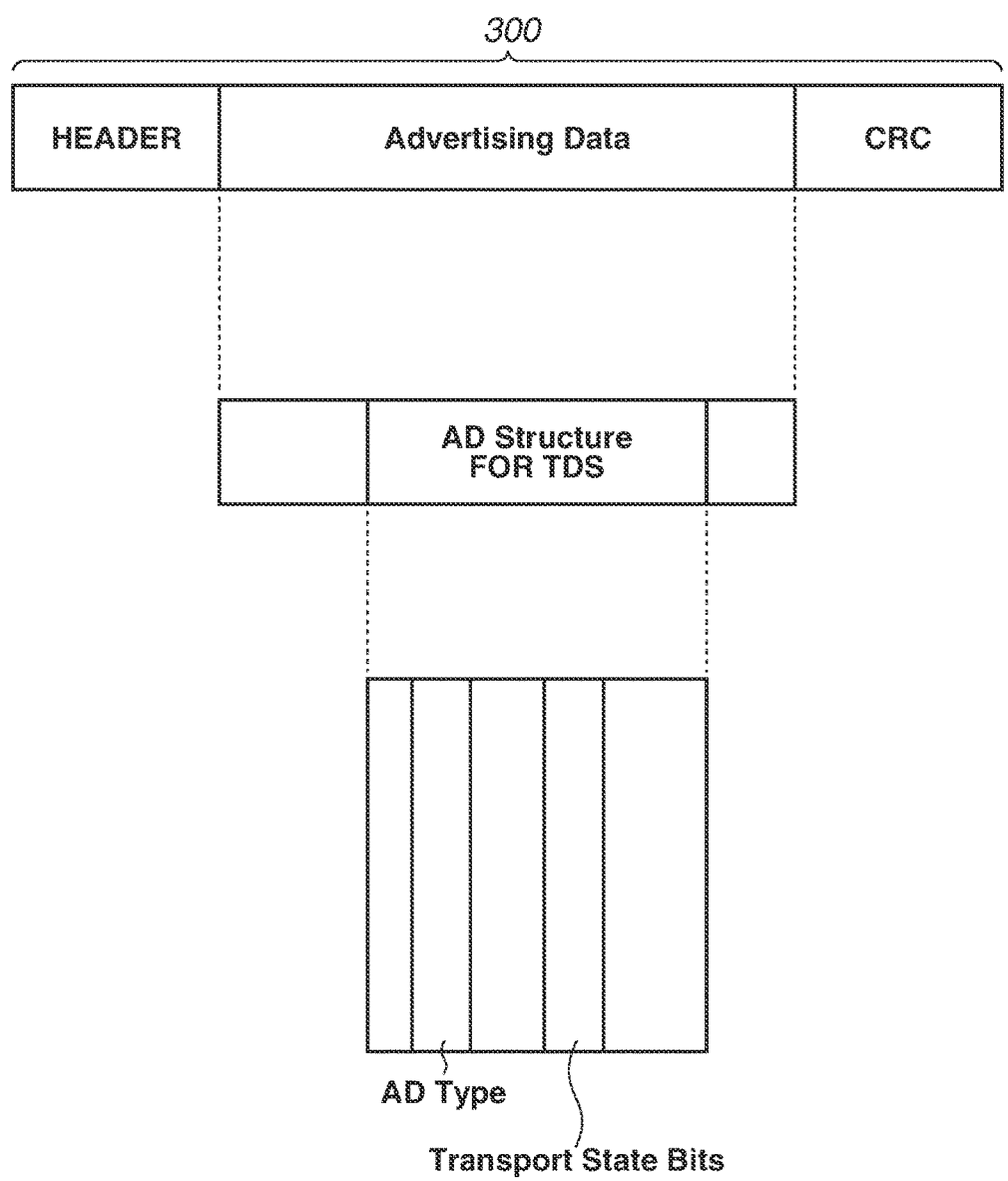
FIG. 3 illustrates a configuration of an advertising packet.

FIG. 3 illustrates the configuration of an advertising packet 300 transmitted by the camera 100. The advertising packet 300 is a packet with a format conforming to the TDS specifications. The advertising packet 300 includes a header, Advertising Data, and a Cyclic Redundancy Check (CRC). The header can include information indicating that the packet is a Bluetooth low energy-based advertising packet and the device address of the camera 100 as a Bluetooth low energy terminal. The CRC, which is data for performing error detection on the reception side, is calculated based on the header and the value of each bit constituting the Advertising Data. Generally, the Advertising Data of a Bluetooth low energy-based advertising packet includes one or a plurality of AD Structures each including an AD Type indicating the type. The advertising packet 300 includes the AD Structure for TDS, i.e., an AD Structure in which the value of the AD Type is defined for TDS.

The AD Structure for TDS includes Transport State Bits defined in the TDS specifications. The camera 100 stores information about a wireless LAN communication function status of the camera 100 in Transport State Bits. The value of Transport State Bits is "Off", "On", or "Temporarily Unavailable". According to the TDS specifications, "Off" is defined as a state where shifting to a wireless LAN connectable state is possible when requested via Bluetooth low energy, and "On" is defined as a state where a wireless LAN connectable state has already been possible. "Temporarily Unavailable" is defined as a state of transition from "Off" to "On" and vice versa. When the smartphone 101 receives an advertising packet 300 in which the value of Transport State Bits is "On", the smartphone 101 turns ON the wireless LAN communication function of the smartphone 101 and connects to the camera 100 via wireless LAN communication. When the smartphone 101 receives the advertising packet 300 in which the value of Transport State Bits is "Off", the smartphone 101 transmits a wireless LAN connection start request to the camera 100 via Bluetooth low energy. More specifically, when the smartphone 101 receives the advertising packet 300 in which the value of Transport State Bits is "On" or "Off", the smartphone 101 will start processing for a wireless LAN connection.

Figure 2:
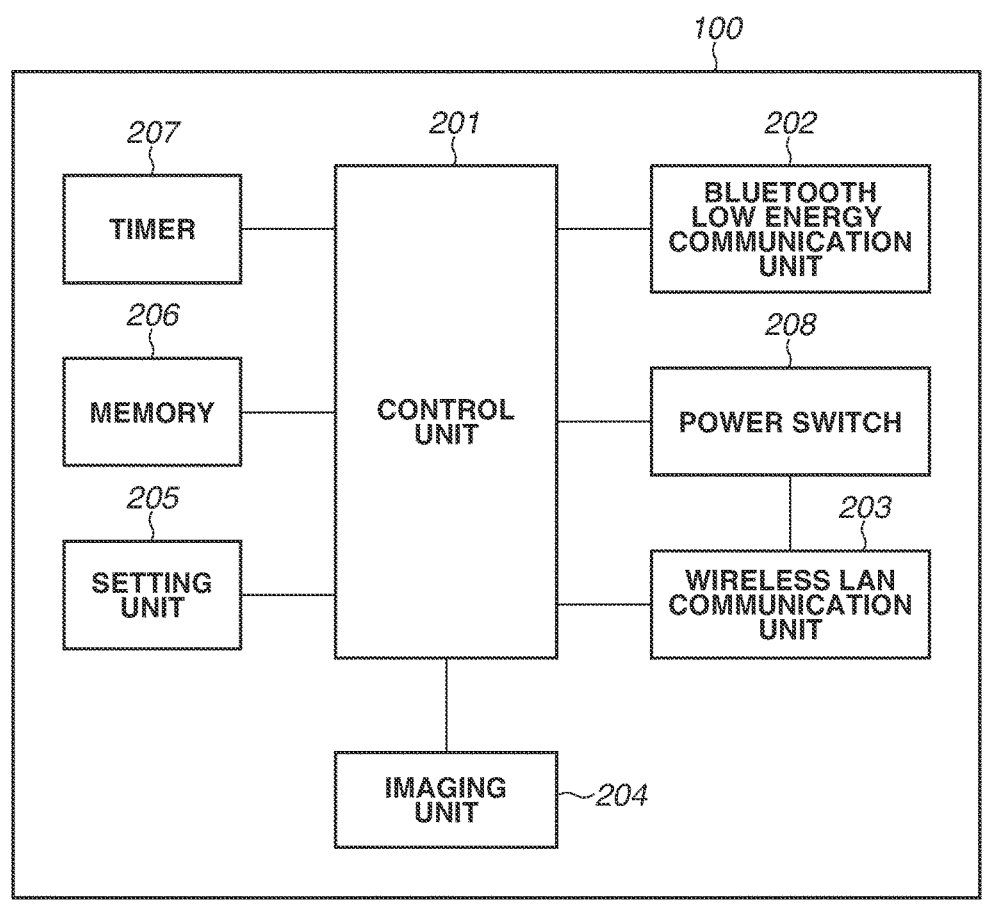
FIG. 2 illustrates a configuration of a camera according to the exemplary embodiment.

FIG. 2 schematically illustrates the configuration of the camera 100 according to the present exemplary embodiment. The camera 100 includes a control unit 201, a Bluetooth low energy communication unit 202, a wireless LAN communication unit 203, an imaging unit 204, a setting unit 205, a memory 206, a timer 207, and a power switch 208.

The control unit 201 controls the entire camera 100 by executing a control program stored in the memory 206. An example of the control unit 201 is a central processing unit (CPU). The control unit 201 uses the memory 206 to store values of variables during execution of the control program. The control unit 201 uses the timer 207 to measure time.

The control unit 201 controls the Bluetooth low energy communication unit 202 to perform data transmission and reception with the smartphone 101 using a communication method defined by the Bluetooth low energy specifications. The Bluetooth low energy communication unit 202 is provided with basic functions that are required for Bluetooth low energy communication, such as an antenna, a modulation/demodulation circuit, and media access control. Likewise, the wireless LAN communication unit 203 is provided with basic functions for wireless LAN communication. The wireless LAN communication unit 203 performs data transmission and reception via wireless LAN communication under control of the control unit 201. The control unit 201 controls the power switch 208 to turn power of the wireless LAN communication unit 203 ON and OFF. The power switch 208 can also be manually operated by a user.

The imaging unit 204, including a lens and an image sensor, converts light obtained through the lens into still image data or moving image data. Based on a user operation, the control unit 201 controls the imaging unit 204 to store, in the memory 206, the image data acquired from the imaging unit 204. The control unit 201 also controls the wireless LAN communication unit 203 to transmit the image data stored in the memory 206 to the smartphone 101. The setting unit 205 performs setting on the functions in the camera 100 based on a setting information input operation by the user. The setting unit 205 can be provided with, for example, a display unit (including a user interface (UI), not illustrated) and buttons (not illustrated) that are used by the user to input setting information. The setting information input by the user can be stored in the memory 206. The setting information includes enable/disable setting information of the wireless LAN communication unit 203. In the present exemplary embodiment, the setting unit 205 can enable or disable wireless LAN communication based on the setting information.

Regardless of the enable/disable setting of wireless LAN communication by the setting unit 205, the control unit 201 determines a wireless LAN disabling period during which wireless LAN communication is disabled based on the operating state of the camera 100. More specifically, while the control unit 201 is currently capturing an image using the imaging unit 204 or while the camera 100 is currently in the image capture mode, the control unit 201 disables wireless LAN communication. Therefore, a period during which wireless LAN communication is disabled by the setting unit 205 and a period during which image capturing is performed using the imaging unit 204 are determined as a wireless LAN disabling period during which wireless LAN communication is disabled. In the wireless LAN disabling period, the Bluetooth low energy communication unit 202 does not transmit the advertising packet 300 or transmits the advertising packet 300 in which the value of Transport State Bits is "Temporarily Unavailable". In a period during which wireless LAN communication is enabled, the Bluetooth low energy communication unit 202 transmits the advertising packet 300 in which the value of Transport State Bits is "On" or "Off". Hereinafter, the term "advertise" means to transmit an advertising signal.

Figure 4:
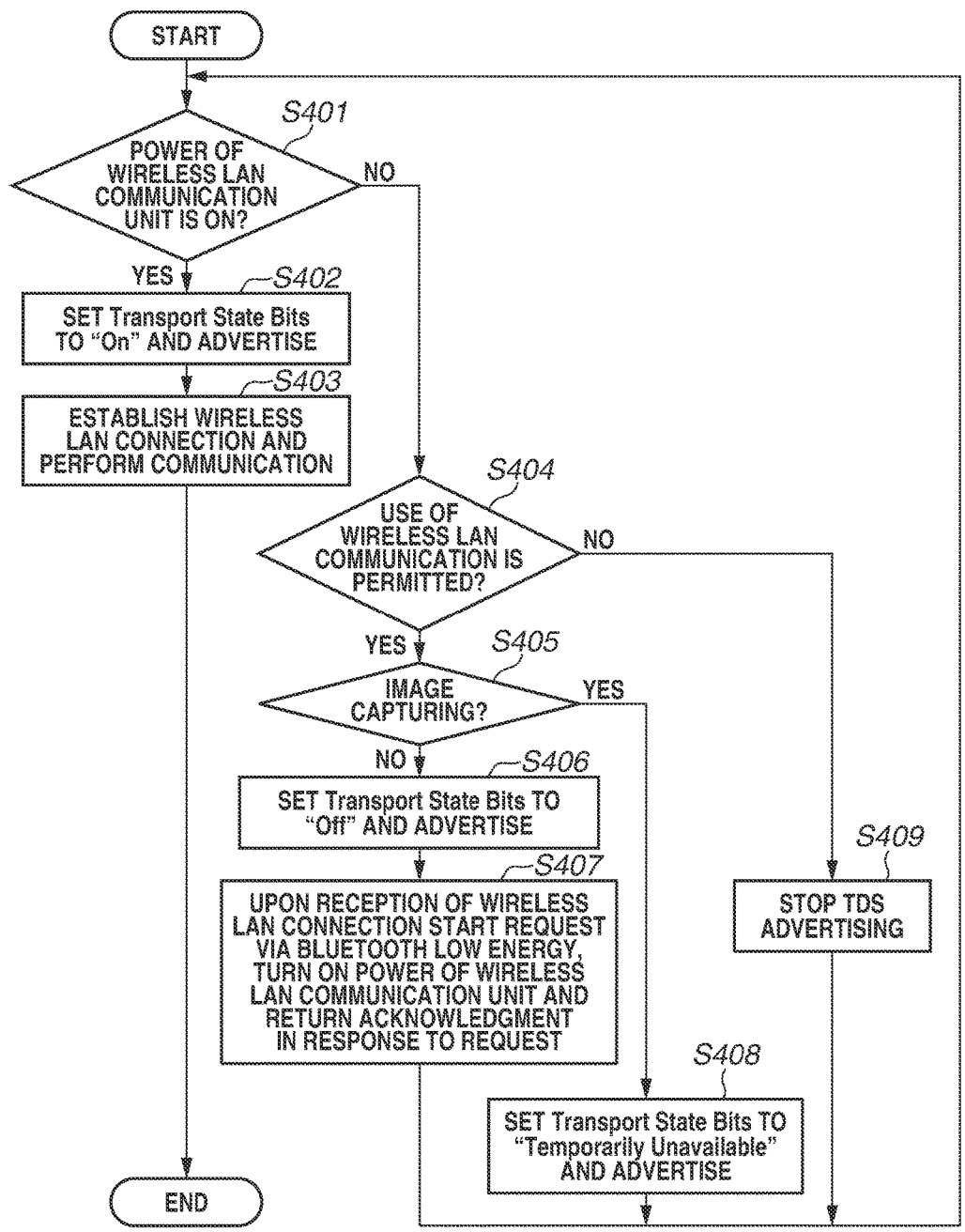
FIG. 4 is a flowchart illustrating processing of a camera according to a first exemplary embodiment.

Operations of the camera 100 according to the present exemplary embodiment will be described below with reference to the flowchart illustrated in FIG. 4. In a case where power of the wireless LAN communication unit 203 (wireless LAN communication function) is ON (YES in step S401), the processing proceeds to step S402. In step S402, the Bluetooth low energy communication unit 202 transmits the advertising packet 300 in which the value of Transport State Bits is set to "On" by the control unit 201. In step S403, the wireless LAN communication unit 203 establishes a wireless LAN connection and then performs wireless LAN communication.

In a case where power of the wireless LAN communication unit 203 is OFF (NO in step S401), the processing proceeds to step S404. Then, in a case where wireless LAN communication is disabled by the setting unit 205 (NO in step S404), the processing proceeds to step S409. In step S409, the Bluetooth low energy communication unit 202 stops the transmission of the advertising packet 300 based on an instruction from the control unit 201. More specifically, in this case, the Bluetooth low energy communication unit 202 does not transmit the advertising packet 300.

In a case where wireless LAN communication is enabled by the setting unit 205 (YES in step S404), the processing proceeds to step S405. In step S405, the control unit 201 changes the subsequent processing based on whether the imaging unit 204 is currently capturing an image (whether the camera 100 is currently in the image capture mode). In a case where the imaging unit 204 is currently in the image capture mode (YES in step S405), the processing proceeds to step S408.

In step S408, the Bluetooth low energy communication unit 202 transmits the advertising packet 300 in which the value of Transport State Bits is set to "Temporarily Unavailable" by the control unit 201. While, in step S405, the control unit 201 determines whether the imaging unit 204 is currently in the image capture mode, the control unit 201 can determine whether any other condition for not starting wireless LAN communication of the camera 100 is satisfied. For example, the opening/closing state of the lid of a storage medium or battery.

The control unit 201 can perform the processing in step S408 when the lid of the storage medium or battery is open. In a case where the imaging unit 204 is not currently capturing an image (NO in step S405), the processing proceeds to step S406. In step S406, the Bluetooth low energy communication unit 202 transmits the advertising packet 300 in which the value of Transport State Bits is set to "On" by the control unit 201. Subsequently, when the Bluetooth low energy communication unit 202 receives a wireless LAN connection start request, then in step S407, the control unit 201 turns ON power of the wireless LAN communication unit 203, and the Bluetooth low energy communication unit 202 returns an acknowledgment in response to the request. If the Bluetooth low energy communication unit 202 cannot receive a wireless LAN connection start request within a predetermined time period in step S407, the processing can return to step S401.

After the processing proceeds to any of steps S406, S408, and S409, the processing returns to step S401. If the state of the wireless LAN communication unit 203, the setting unit 205, or the imaging unit 204 has changed when the processing returns to step S401, the processing to be performed is also changed among the processing procedures in step S406, S408, and S409.

Figure 5:
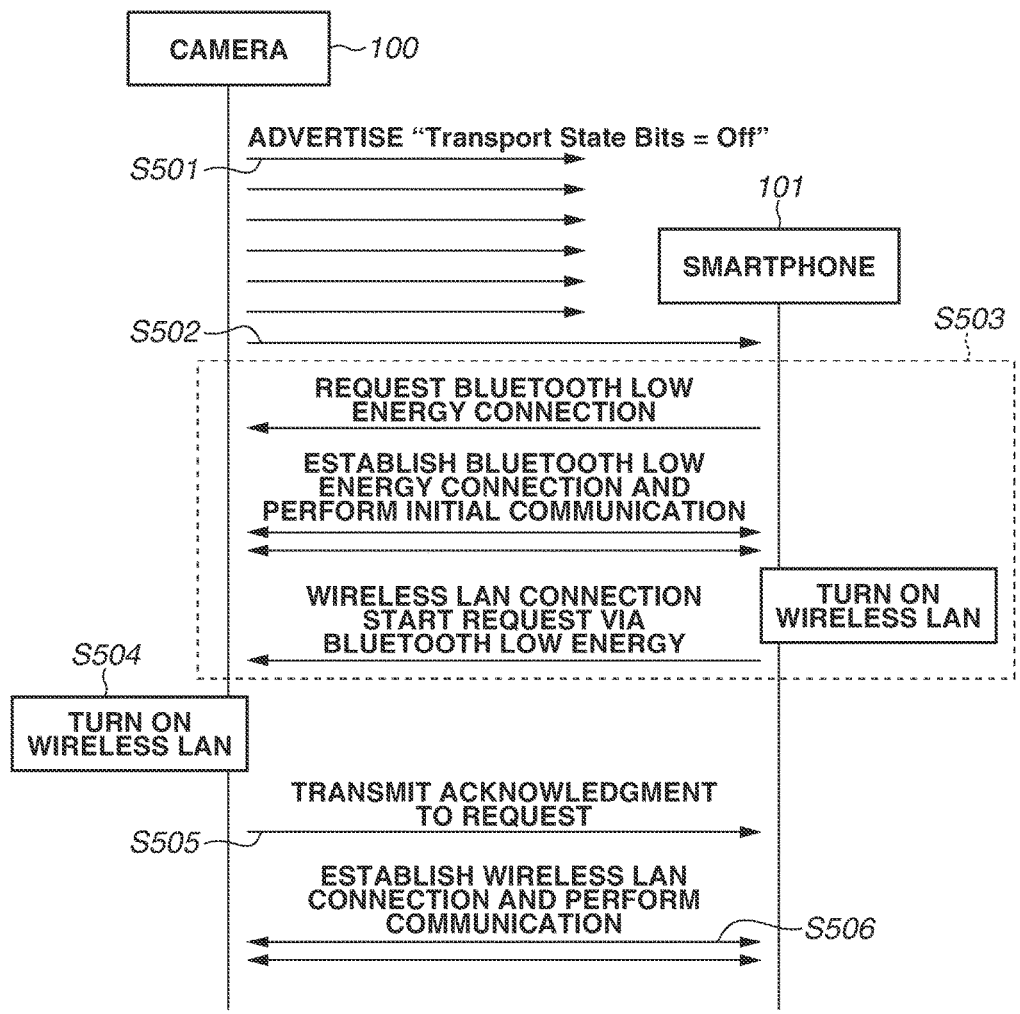
FIG. 5 illustrates an example of a communication sequence between the camera and a smartphone according to the first exemplary embodiment.

For example, suppose that the camera 100 is in an initial state where power of the wireless LAN communication unit 203 is OFF, wireless LAN communication is set to be enabled by the setting unit 205, and the imaging unit 204 is not currently performing an imaging operation. A description of this is provided below, with reference to FIG. 5, as an example of a procedure of communication performed when the smartphone 101 and the camera 100 are in proximity to each other. FIG. 5 illustrates an example of a communication sequence between the camera 100 and the smartphone 101 according to the present exemplary embodiment.

In the above-described initial state, the processing, according to the flowchart illustrated in FIG. 4, proceeds in the following order: NO in step S401, YES in step S404, and then step S406. In step S501, the Bluetooth low energy communication unit 202 of the camera 100 repetitively transmits an advertising packet in which the value of Transport State Bits is "Off". In step S502, when the smartphone 101 and the camera 100 are in proximity to each other, the smartphone 101 receives the advertising packet. Since the value of Transport State Bits of the received advertising packet is "Off", then in step S503, the smartphone 101 transmits a wireless LAN connection start request to the camera 100 via Bluetooth low energy.

Specific processing in step S503 will be described below. First, the smartphone 101 transmits a Bluetooth low energy connection request (CONNECT_REQ) to the camera 100 to establish a Bluetooth low energy connection. Subsequently, the smartphone 101 performs initial communication defined by the Bluetooth low energy specifications. The initial communication includes a procedure for checking the Bluetooth low energy protocol version, a procedure for determining the upper limit value of the packet size, and a procedure for exchanging encryption keys. Next, the smartphone 101 sets the wireless LAN communication function of the smartphone 101 to ON, and transmits a wireless LAN connection start request via Bluetooth low energy using an Active Transport command defined in the TDS specifications. The above-described procedure for transmitting a wireless LAN connection start request is an example. Alternatively, the smartphone 101 can transmit a wireless LAN connection start request using other methods conforming to the TDS specifications. For example, the smartphone 101 can set the wireless LAN communication function of the smartphone 101 to ON and then transmit an advertising packet in which the value of Transport State Bits is "On" via Bluetooth low energy.

When the Bluetooth low energy communication unit 202 of the camera 100 receives a wireless LAN connection start request, then in step S504, the control unit 201 controls the power switch 208 to turn ON power of the wireless LAN communication unit 203. In step S407 (S505), the Bluetooth low energy communication unit 202 returns an acknowledgment in response to the request. For example, the Bluetooth low energy communication unit 202 returns, as an acknowledgment, a result code (Success) to the Activate Transport command received from the smartphone 101. In this process, the Bluetooth low energy communication unit 202 can return an acknowledgment using other methods conforming to TDS. After that, the processing returns to step S401.

In this time of processing, since power of the wireless LAN communication unit 203 is ON (YES in step S401), the processing proceeds to step S402. In step S402, the Bluetooth low energy communication unit 202 transmits an advertising packet in which the value of Transport State Bits is set to "On" by the control unit 201. Since the wireless LAN communication function is ON in both the camera 100 and the smartphone 101 at this timing, then in step S403 (S506), the camera 100 and the smartphone 101 establish a wireless LAN connection and perform wireless LAN communication.

Either the procedure for returning an acknowledgment in step S407 or the procedure for transmitting an advertising packet in step S402 can be omitted. More specifically, when the result code is returned in step S407, the procedure for transmitting an advertising packet in step S402 can be omitted. Instead of transmitting an acknowledgment in step S407, the Bluetooth low energy communication unit 202 can transmit an advertising packet in which the value of Transport State Bits is "On" in step S402, while not transmitting anything in step S407.

Figure 6:
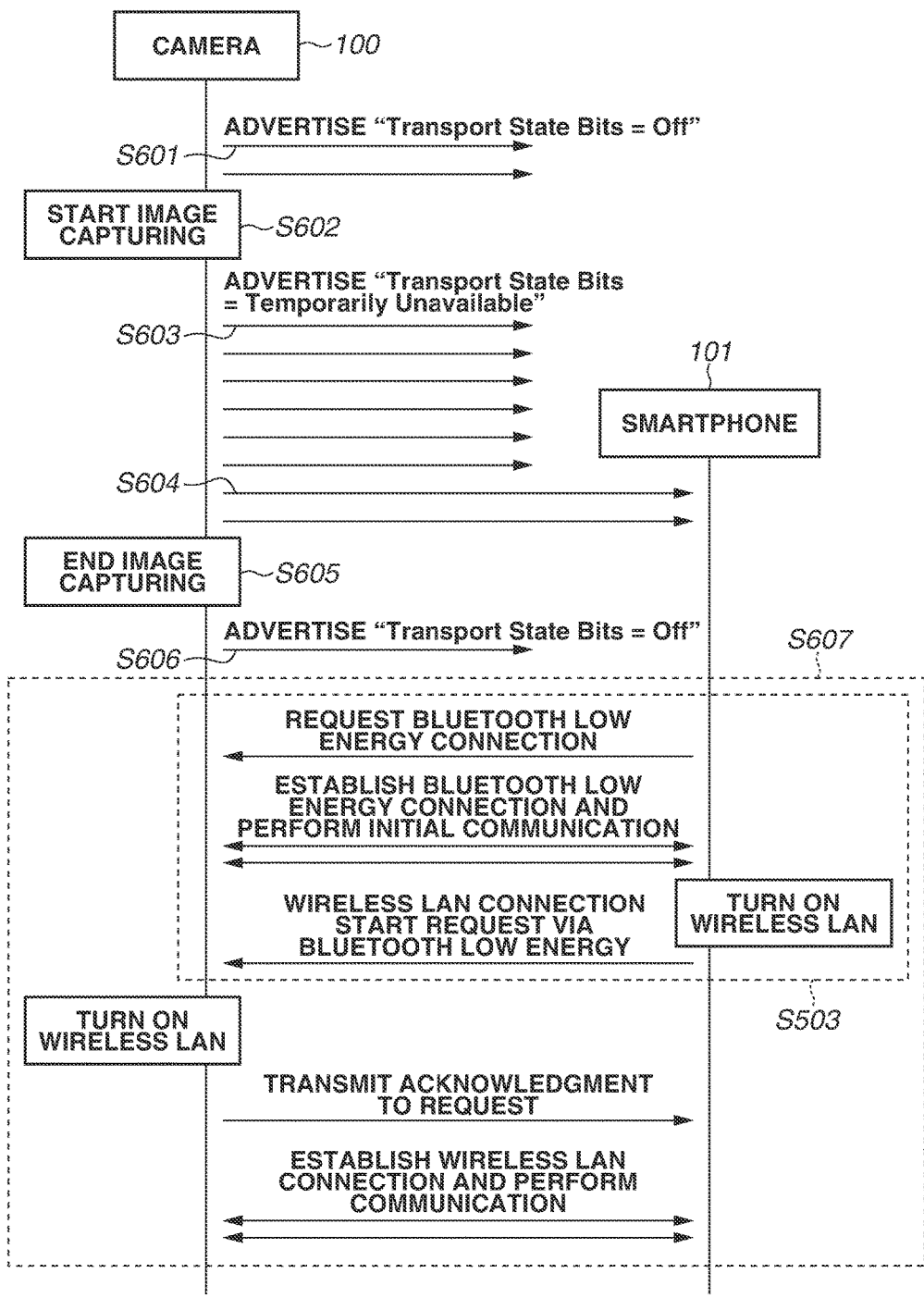
FIG. 6 illustrates another example of a communication sequence between the camera and the smartphone according to the first exemplary embodiment.

Next, suppose that the camera 100 in the above-described initial state starts image capturing, and then the camera 100 and the smartphone 101 are in proximity to each other. A procedure of communication in this case will be described below with reference to FIG. 6, which illustrates another example of a communication sequence between the camera 100 and the smartphone 101 according to the present exemplary embodiment. The initial state of the camera 100 refers to a state where power of the wireless LAN communication unit 203 is OFF, wireless LAN communication is set to be enabled by the setting unit 205, and the imaging unit 204 is not currently performing an imaging operation.

Before the camera 100 starts image capturing, the processing proceeds, according to the flowchart illustrated in FIG. 4, in the following order: NO in step S401, YES in step S404, and then step S406. In step S601, the Bluetooth low energy communication unit 202 of the camera 100 repetitively transmits an advertising packet in which the value of Transport State Bits is "Off". In a case where the camera 100 starts image capturing (YES in step S405) (S602), the processing proceeds to step S408 (S603). In step S408 (S603), the Bluetooth low energy communication unit 202 transmits an advertising packet in which the value of Transport State Bits is "Temporarily Unavailable". When the smartphone 101 is in proximity to the camera 100 during image capturing of the camera 100, then in step S604, the smartphone 101 receives this advertising packet. As described above, only when the value of Transport State Bits of the received advertising packet is "On" or "Off" does the smartphone 101 start processing for a wireless LAN connection. Accordingly, the smartphone 101 does not transmit a wireless LAN connection start request to the transmission source of this advertising packet.

Subsequently, in a case where the camera 100 ends image capturing (NO in step S405) (S605), the processing proceeds to step S406 (S606). In step S406 (S606), the Bluetooth low energy communication unit 202 transmits an advertising packet in which the value of Transport State Bits is "Off".

The processing procedures after that is similar to the one illustrated in FIG. 5, and in step S607, the camera 100 and the smartphone 101 establish a wireless LAN connection and perform wireless LAN communication.

As described above, while the camera 100 performs an imaging operation (steps S603 to S605), the smartphone 101 does not transmit a wireless LAN connection start request even if the smartphone 101 and the camera 100 are in proximity to each other. Consequently, the smartphone 101 does not perform the processing in step S503 including the preparation for transmitting a wireless LAN connection start request. When the camera 100 completes image capturing, the camera 100 and the smartphone 101 establish a wireless LAN connection.

Figure 7:
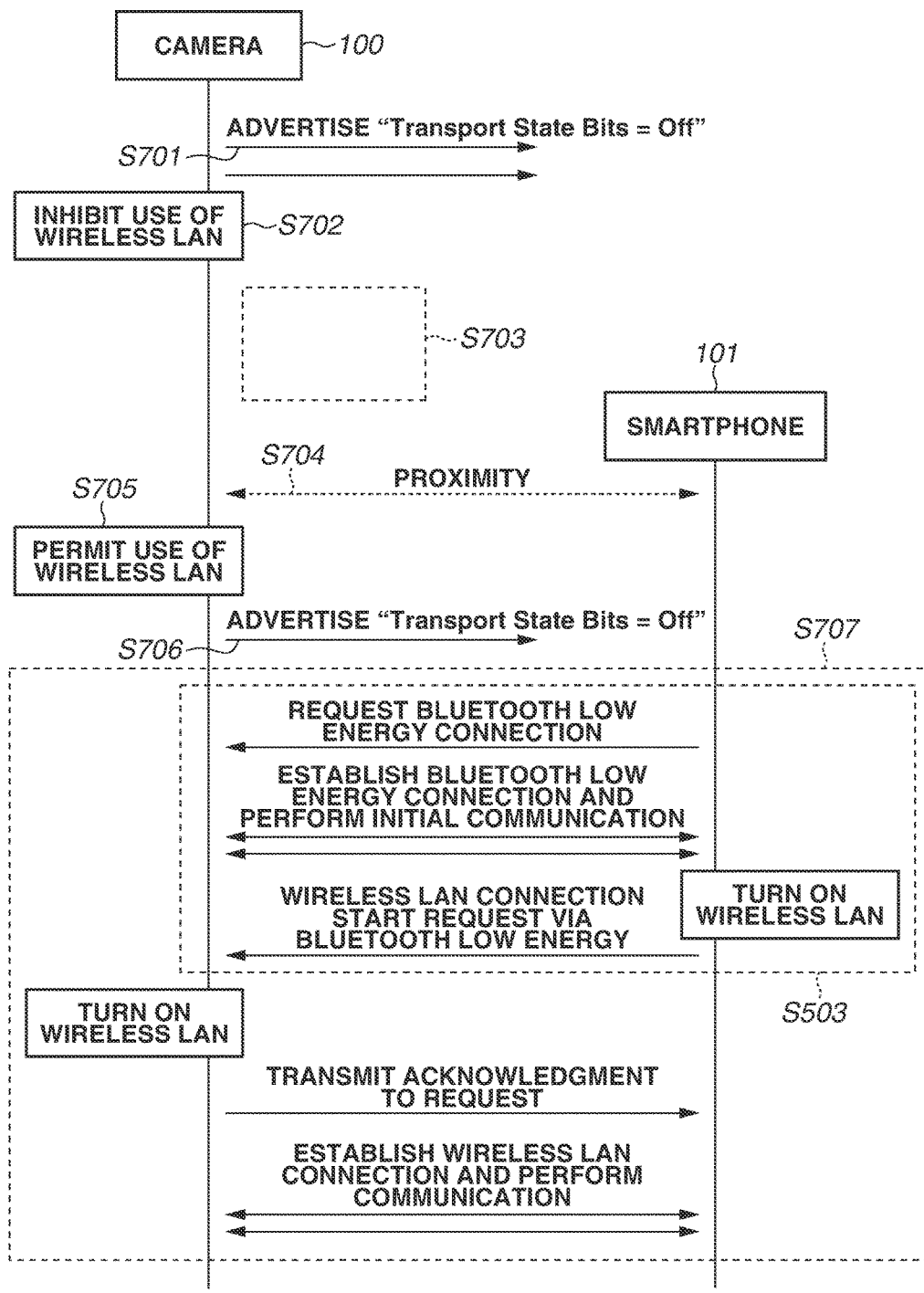
FIG. 7 illustrates yet another example of a communication sequence between the camera and the smartphone according to the first exemplary embodiment.

Yet another communication procedure performed when the camera 100 and the smartphone 101 are in proximity to each other will be described below with reference to FIG. 7, which illustrates another example of a communication sequence between the camera 100 and the smartphone 101 according to the present exemplary embodiment. The initial state of the camera 100 in this case refers to a state where power of the wireless LAN communication unit 203 is OFF, wireless LAN communication is set to be disabled by the setting unit 205, and the imaging unit 204 is not currently performing an imaging operation.

In this initial state, the processing proceeds, according to the flowchart illustrated in FIG. 4, in the following order: NO in step S401, YES in step S404, and then step S406. In step S701, the Bluetooth low energy communication unit 202 of the camera 100 repetitively transmits an advertising packet in which the value of Transport State Bits is set to "Off" by the control unit 201. Suppose that in this case, the setting unit 205 disables (inhibits) wireless LAN communication based on the setting information input by the user (NO in step S404) (S702). In such a case, in step S409 (S703), the transmission of a TDS advertising packet is stopped. In step S704, while wireless LAN communication is disabled, the smartphone 101 does not receive a TDS advertising packet from the camera 100 even when the smartphone 101 and the camera 100 are in proximity to each other. Consequently, the smartphone 101 does not transmit a wireless LAN connection start request to the camera 100.

Then, suppose that the setting unit 205 changes a setting to enable wireless LAN communication based on the setting information input by the user (YES in step S404) (S705), and the processing proceeds to step S405. In this case, the Bluetooth low energy communication unit 202 of the camera 100 transmits an advertising packet in which the value of Transport State Bits is "On" (NO in step S405), and the processing proceeds to step S406 (S706). The processing procedures after that is similar to the one illustrated in FIG. 5, and in step S707, the camera 100 and the smartphone 101 establish a wireless LAN connection and perform wireless LAN communication.

As described above, in steps S702 to S705, while wireless LAN communication is disabled, the smartphone 101 does not transmit a wireless LAN connection start request even when the camera 100 and the smartphone 101 are in proximity to each other. Consequently, the smartphone 101 does not perform the processing in step S503 including the preparation for transmitting a wireless LAN connection start request. When the setting unit 205 changes a setting to enable wireless LAN communication based on the setting information input by the user, the camera 100 and the smartphone 101 establish a wireless LAN connection.

Figure 8:
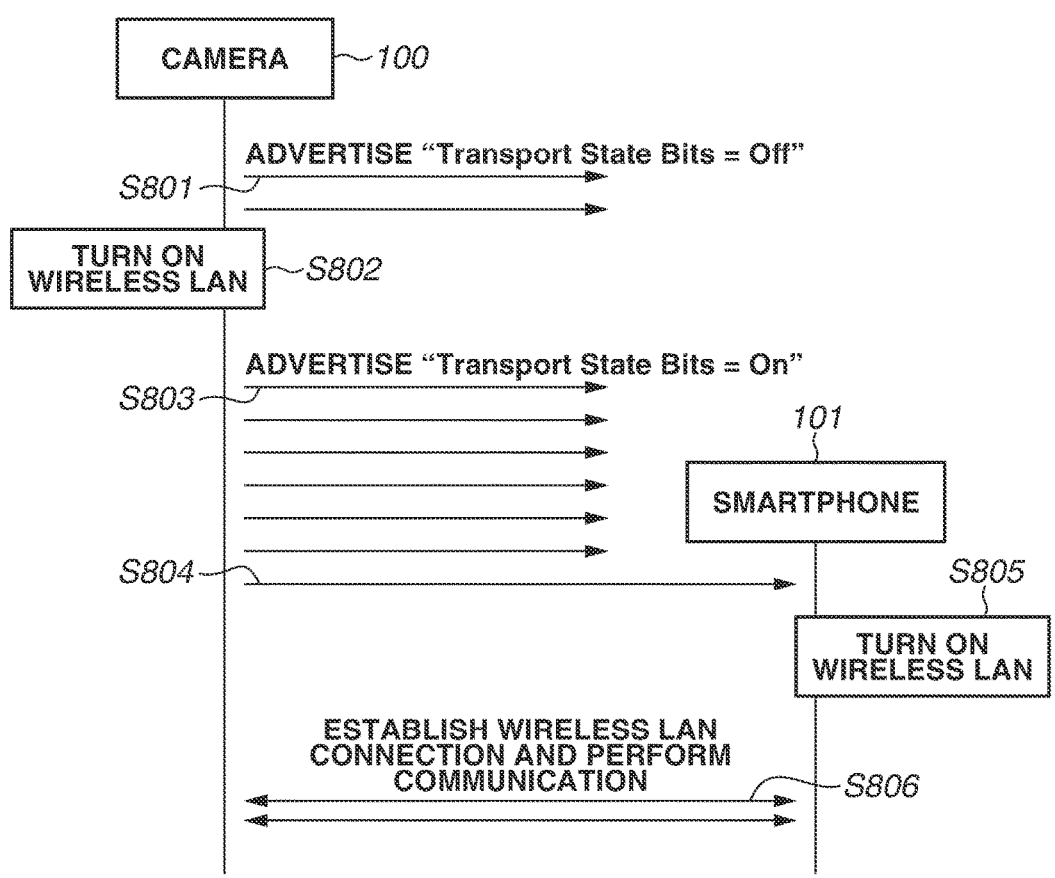
FIG. 8 illustrates yet another example of a communication sequence between the camera and the smartphone according to the first exemplary embodiment.

Yet another communication procedure performed when the camera 100 and the smartphone 101 are in proximity to each other will be described below with reference to FIG. 8, which illustrates yet another example of a communication sequence between the camera 100 and the smartphone 101 according to the present exemplary embodiment. The initial state of the camera 100 in this case refers to a state where power of the wireless LAN communication unit 203 is OFF, wireless LAN communication is set to be disabled by the setting unit 205, and the imaging unit 204 is not currently performing an imaging operation. The camera 100 in the initial state is in proximity to the smartphone 101 after power of the wireless LAN communication unit 203 turns ON.

Before power of the wireless LAN communication unit 203 is turned ON in the camera 100, the processing proceeds, according to the flowchart illustrated in FIG. 4, in the following order: NO in step S401, YES in step S404, and then in step S406. In step S406 (S801), the Bluetooth low energy communication unit 202 of the camera 100 repetitively transmits an advertising packet in which the value of Transport State Bits is "Off". In a case where power of the wireless LAN communication unit 203 turns ON in response to the user operating the power switch 208 (YES in step S401) (S802), the processing proceeds to step S402 (S803). In step S402 (S803), the Bluetooth low energy communication unit 202 repetitively transmits an advertising packet in which the value of Transport State Bits is "On". When the smartphone 101 and the camera 100 are in proximity to each other when power of the wireless LAN communication unit 203 is ON, then in step S804, the smartphone 101 receives this advertising packet. Since the value of Transport State Bits of the received advertising packet is "On", then in step S805, the smartphone 101 turns ON the wireless LAN of the smartphone 101 based on the TDS specifications. Since wireless LAN is ON in both the camera 100 and the smartphone 101 at this timing, then in step S403 (S806), the camera 100 and the smartphone 101 establish a wireless LAN connection and perform wireless LAN communication. More specifically, when the smartphone 101 and the camera 100 are in proximity to each other when the wireless LAN communication unit 203 of the camera 100 is ON, a wireless LAN connection is established.

As described above with reference to FIGS. 5 to 8, the smartphone 101 conforming to the TDS specifications does not transmit a wireless LAN connection start request via Bluetooth low energy while the camera 100 determines that wireless LAN communication of the camera 100 is disabled. More specifically, the camera 100 and the smartphone 101 do not establish a wireless LAN connection. Accordingly, a failure in the processing for starting a wireless LAN connection is avoided in both the camera 100 and the smartphone 101. This prevents wasteful consumption of battery power. As a result, the operation time between charges is prolonged, and consequently, user convenience can be improved. The same effect can be achieved even when the smartphone 101 according to the present exemplary embodiment is replaced with other communication apparatuses conforming to the TDS specifications.

According to the present exemplary embodiment, the camera 100 stops advertising when wireless LAN is disabled by the setting unit 205 and advertises "Temporarily Unavailable" during an imaging operation. Alternatively, the procedure of the above-described processing can be changed by exchanging the conditions in steps S404 and S405 illustrated in FIG. 4. The camera 100 can stop advertising or advertise "Temporarily Unavailable" when either of the above-described two conditions is satisfied. In either case, a failure in the processing for starting a wireless LAN connection is prevented. Consequently, user convenience can be improved. If the camera 100 is replaced with an apparatus other than a camera, the apparatus can advertise "Temporarily Unavailable" depending on a determination of whether the apparatus is in other states where wireless LAN communication is disabled instead of on the determination of whether the apparatus is currently in the image capture mode.

A second exemplary embodiment will be described below. In the present exemplary embodiment, wireless LAN communication with the smartphone 101 is disabled while the camera 100 is currently performing wireless LAN communication with a different communication apparatus. The different communication apparatus is, for example, an access point of wireless LAN, another smartphone, or a printer.

Figure 9:
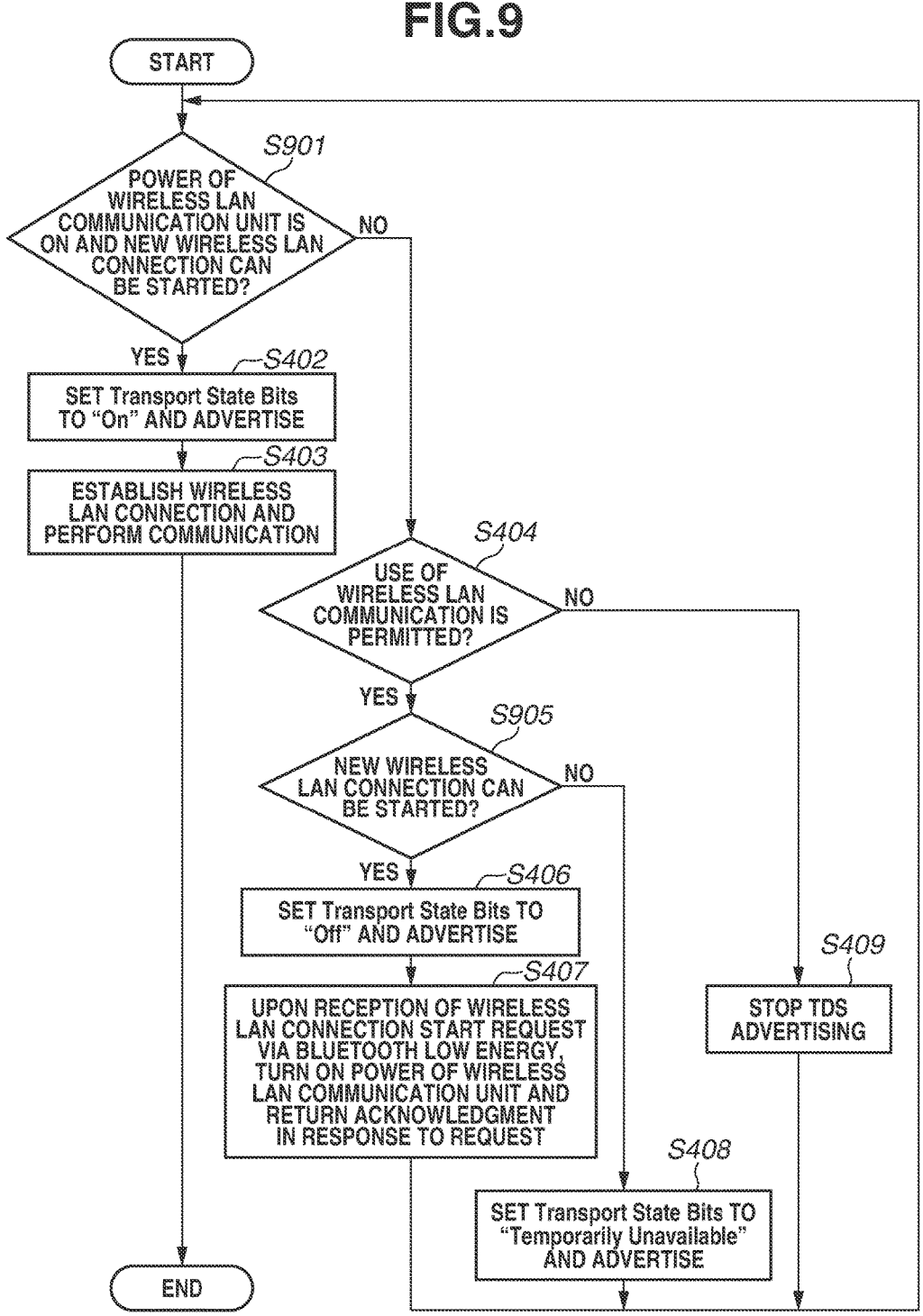
FIG. 9 is a flowchart illustrating processing of the camera according to a second exemplary embodiment.

Differences between the second exemplary embodiment and the first exemplary embodiment will be described below. FIG. 9 is a flowchart illustrating processing of the camera 100 according to the present exemplary embodiment. Referring to FIG. 9, steps S401 and S405 illustrated in FIG. 4 are replaced with steps S901 and S905, respectively.

According to the present exemplary embodiment, the wireless LAN communication unit 203 of the camera 100 can establish a wireless LAN connection with just one communication apparatus at one time. When the smartphone 101 is in proximity to the camera 100 while the camera 100 is currently performing wireless LAN communication with a different communication apparatus, the camera 100 cannot start a new wireless LAN connection although power of the wireless LAN communication unit 203 is ON. In such a case, the camera 100 performs the processing, according to the flowchart illustrated in FIG. 9, in the following order: NO in step S901, YES in step S404, NO in step S905, and then step S408.

In step S408, the Bluetooth low energy communication unit 202 transmits the advertising packet 300 in which the value of Transport State Bits is "Temporarily Unavailable". This advertising packet does not induce a wireless LAN connection request from the smartphone 101. Consequently, while the camera 100 cannot start wireless LAN communication with the smartphone 101 since the camera 100 is currently performing wireless LAN communication with the different communication apparatus, a wireless LAN connection request conforming to TDS is prevented from being transmitted from the smartphone 101. As a result, a similar effect to that in the first exemplary embodiment can be attained.

In the present exemplary embodiment, the wireless LAN communication unit 203 can establish a wireless LAN connection with just one communication apparatus at one time. Alternatively, the wireless LAN communication unit 203 can perform a wireless LAN connection with up to N communication apparatuses at one time. The condition for starting a new wireless LAN connection in steps S901 and S905 is set in a manner that, when performing each piece of processing, the wireless LAN communication unit 203 performs N–1 or less number of wireless LAN connections at one time. Accordingly, a similar effect to the above-described one can be attained.

Figure 10:
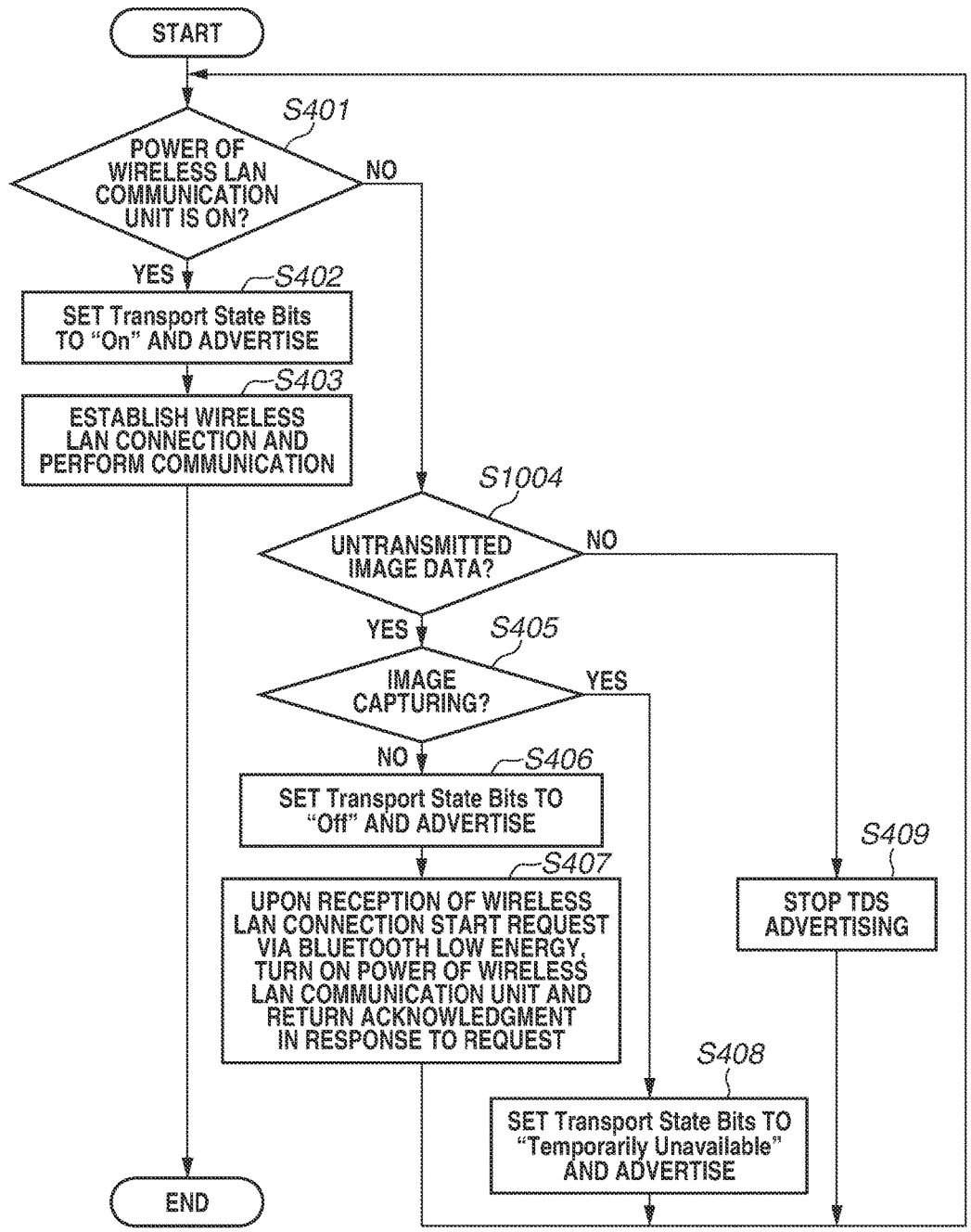
FIG. 10 is a flowchart illustrating processing of the camera according to a third exemplary embodiment.

In a third exemplary embodiment, wireless LAN communication is inhibited (disabled) while the camera 100 contains no image data to be transmitted via wireless LAN communication. A description of such a mode will be given below. Differences between the third exemplary embodiment and the first exemplary embodiment will be described below. FIG. 10 is a flowchart illustrating processing of the camera 100 according to the present exemplary embodiment. Referring to FIG. 10, step in S404 illustrated in FIG. 4 is replaced with step S1004.

When the camera 100 is in proximity to the smartphone 101 while the camera 100 contains no un-transmitted image data, the processing proceeds, according to the flowchart illustrated in FIG. 10, in the following order: NO in step S401, NO in step S1004. In step S409, the Bluetooth low energy communication unit 202 does not transmit the advertising packet 300. Since the advertising packet 300 is not transmitted, the camera 100 does not induce a wireless LAN connection request from the smartphone 101. Consequently, while the camera 100 does not have any image data to be transmitted via wireless LAN communication, a wireless LAN connection request conforming to TDS is prevented from being transmitted from the smartphone 101. As a result, a similar effect to that in the first exemplary embodiment can be attained. When transmitting data other than image data from the camera 100, a similar effect can also be achieved by determining whether there is data to be transmitted in the camera 100.

Figure 11:
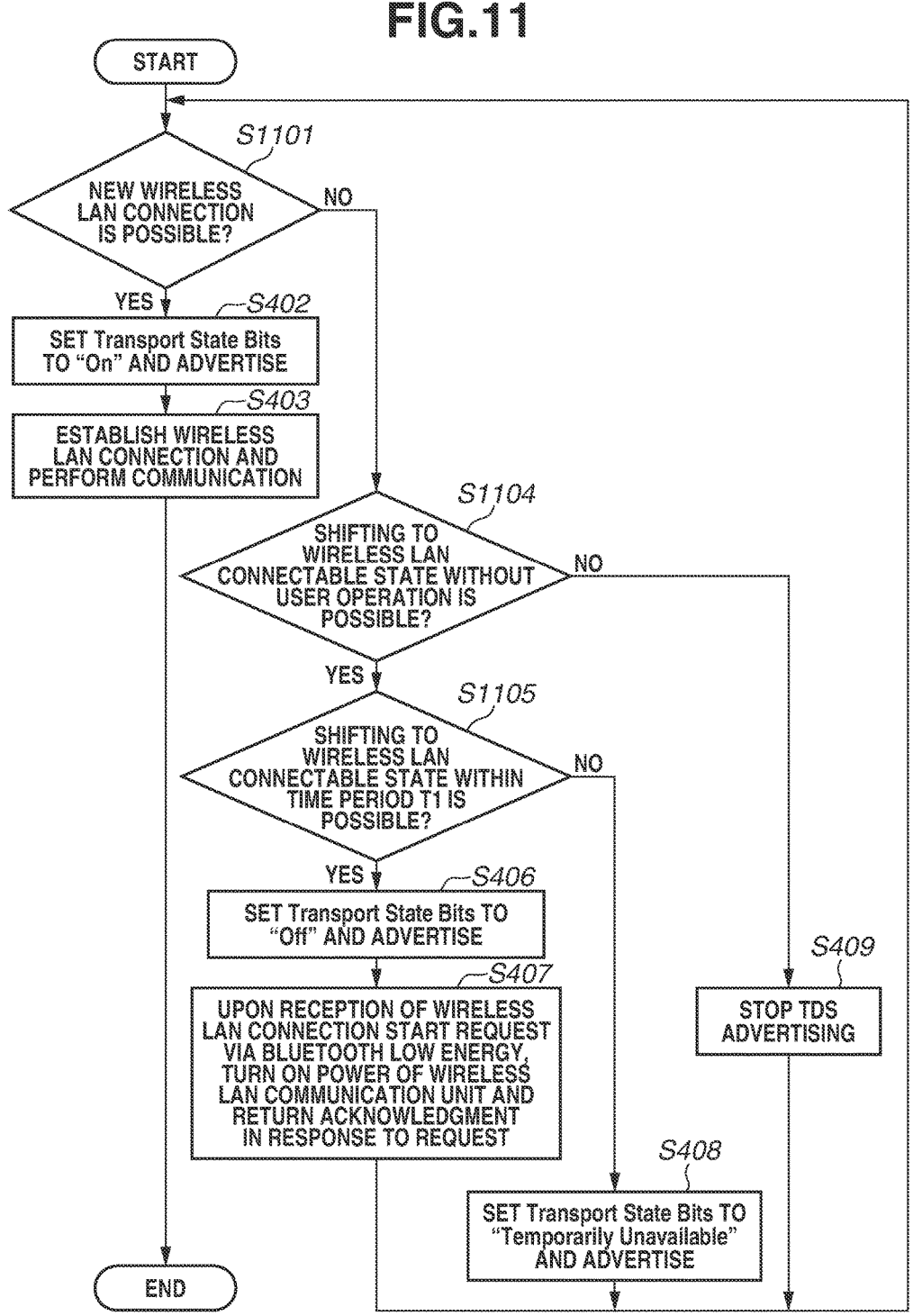
FIG. 11 is a flowchart illustrating processing of the camera according to a fourth exemplary embodiment.

A fourth exemplary embodiment is a more generalized version of the first and the second exemplary embodiments. Differences between the fourth exemplary embodiment and the first exemplary embodiment will be described below. FIG. 11 is a flowchart illustrating processing of the camera 100 according to the present exemplary embodiment. Referring to FIG. 11, steps S401, S404, and S405 illustrated in FIG. 4 are replaced with steps S1101, S1104, and S1105, respectively.

In step S1101, the control unit 201 determines whether the camera 100 is in a state where a new wireless LAN connection is possible. A state where a new wireless LAN connection is possible is, for example, a state where power of the wireless LAN communication unit 203 is ON, there is an availability in terms of the maximum number of connections at one time, and a wireless LAN connection is not disabled by the user. Other conditions can be added as a condition for a state where a new wireless LAN connection is possible.

In a case where the camera 100 is in a state where a new wireless LAN connection is possible (YES in step S1101), the processing proceeds to step S402. In a case where the camera 100 is not in a state where a new wireless LAN connection is possible (NO in step S1101), the processing proceeds to step S1104. In step S1104, the control unit 201 determines whether shifting to a wireless LAN connectable state is possible without a user operation. In a case where shifting to a wireless LAN connectable state is possible with a user operation (NO in step S1104), the processing proceeds to step S409. In a case where shifting to a wireless LAN connectable state is possible without a user operation (YES in step S1104), the processing proceeds to step S1105. An example of a case where a user operation is required is a case where the enable/disable setting of wireless LAN communication is changed by the setting unit 205. An example of a case where a user operation is not required is a case where image data is being transmitted to a different communication apparatus and a wireless LAN connection with the communication apparatus is automatically disconnected after completion of transmission. In this case, if the user waits without operating the camera 100, the camera 100 will shift to a state where a new wireless LAN connection is possible. In a case where shifting to a wireless LAN connectable state is possible (YES in step S1104), then in step S1105, the control unit 201 determines which of processing in step S406 and processing in step S408 is to be performed based on whether the wait time is within a predetermined time (within a time period T1). For example, when the camera 100 is transmitting image data to a different communication apparatus, the processing can proceed to step S406 when the progress is 90% or to step S408 when the progress is 30%.

In a case where the time period till the shifting to a wireless LAN connectable state is unknown because of a user operation wait state or a case where a predetermined time period or longer (the time period T1 or longer) is required, a wireless LAN connection request is prevented from being transmitted from the smartphone 101. Consequently, a similar effect to that in the first exemplary embodiment can be attained.

Figure 12:
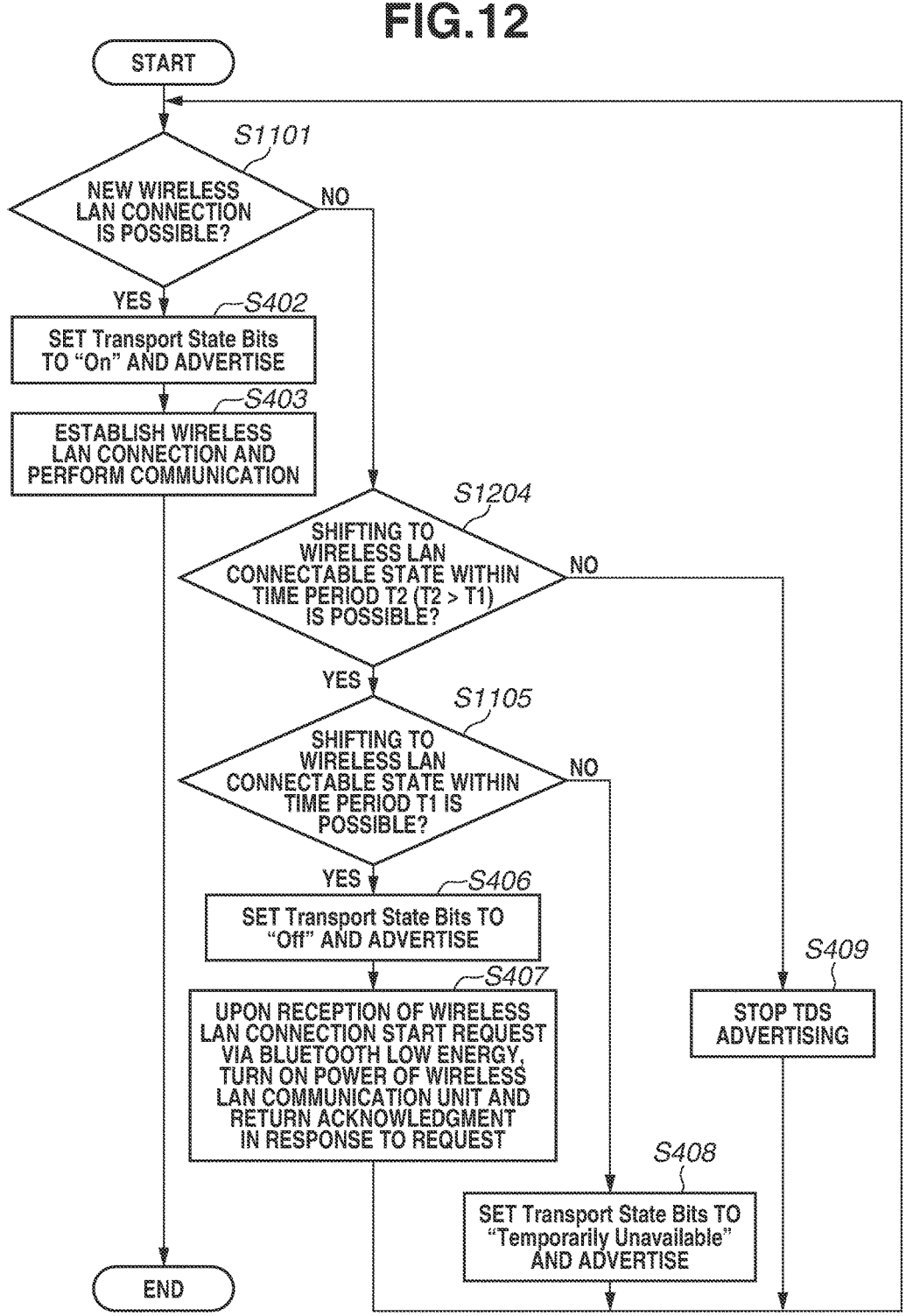
FIG. 12 is a flowchart illustrating processing of the camera according to a modification of the fourth exemplary embodiment.

A modification of the present exemplary embodiment will be described below with reference to FIG. 12. FIG. 12 is a flowchart illustrating processing of the camera 100 according to the modification of the present exemplary embodiment. Referring to FIG. 12, step S1104 illustrated in FIG. 11 is replaced with step S1204. In a case where the time period until the shifting to a wireless LAN connectable state is completed exceeds a time period T2 (T2>T1) (NO in step S1204), the processing proceeds to step S409. Accordingly, in a case where the remaining time period during which wireless LAN communication is disabled is long, advertising can be stopped to further reduce the power consumption of the camera 100.

According to the above-described exemplary embodiments, it is possible to prevent an abortive request from being transmitted to a communication apparatus (camera 100) from another communication apparatus (smartphone 101) operating in conformance with the TDS specifications existing around the communication apparatus (camera 100). It is also possible to prevent the smartphone 101 from preparing to transmit the request. As a result, the power consumption can be reduced in both communication apparatuses. This prolongs the operation time of battery-operated apparatuses between charges. Accordingly, user convenience is improved.

At least one of the functions according to the above-described exemplary embodiments can be implemented by supplying a program to a system or apparatus via a network or storage medium, and at least one processor in a computer of the system or apparatus reads and executes the program. In addition, at least one function also be achieved by a circuit, such as an application specific integrated circuit (ASIC)).

The camera 100 and the smartphone 101 can be, for example, an image input apparatus, such as a scanner, or an image output apparatus, such as a printer, a copying machine, and a projector. The camera 100 and the smartphone 101 can also be a storage device, such as a hard disk drive and memory device, or an information processing apparatus, such as a personal computer (PC).

At least part of the processing of the flowcharts illustrated in FIGS. 4 and 9 to 12 can be implemented by hardware. When implementing the processing by hardware, for example, a dedicated circuit is automatically generated on a field programmable gate array (FPGA) based on a program for implementing each step by using a predetermined compiler. Similar to the FPGA, a gate array circuit can be formed to implement the processing by hardware.

According to the present disclosure a communication apparatus can change a communication method to a different communication method to control another apparatus not to issue a request for starting the different communication method that has been unavailable in the communication apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183359, filed Sep. 20, 2016, which is hereby incorporated by reference herein in its entirety.

What is claimed is:

1. A communication apparatus comprising:
a first communication unit configured to perform communication conforming to Transport Discovery Service specifications based on Bluetooth low energy;
a second communication unit configured to perform communication based on a non-Bluetooth low energy communication method;
a control unit configured to, in a case where the communication based on the non-Bluetooth low energy communication method by the second communication unit is unavailable, instruct the first communication unit not to transmit an advertising packet conforming to the Transport Discovery Service specifications, based on that it is set that the communication based on the non-Bluetooth low energy communication method is not permitted, and instruct the first communication unit to transmit an advertising packet conforming to the Transport Discovery Service specifications with Transport State Bits set "OFF", based on that it is set that the communication based on the non-Bluetooth low energy communication method is permitted;
an establishing unit configured to establish a Bluetooth low energy connection for performing communication based on Bluetooth low energy with first another communication apparatus that has received the advertising packet conforming to the Transport Discovery Service specifications that has been transmitted by the first communication unit in accordance with instructions by the control unit; and
a receiving unit configured to receive, from the first another communication apparatus, a request for initiating the communication based on the non-Bluetooth low energy communication method via the Bluetooth low energy connection that has been established by the establishing unit;
wherein the first communication unit, the second communication unit, the control unit, the establishing unit, and the receiving unit are implemented by at least one processor.

2. The communication apparatus according to claim 1, further comprising:
a first setting unit configured to set, based on user operation, whether to permit the communication based on the non-Bluetooth low energy communication method or not.

3. The communication apparatus according to claim 1, further comprising:
a second setting unit configured to set whether to permit the communication based on the non-Bluetooth low energy communication method or not based on whether un-transmitted image data exists or not;
wherein the second setting unit sets that the communication based on the non-Bluetooth low energy communication method is not permitted in a case where the un-transmitted image data does not exist.

4. The communication apparatus according to claim 1, further comprising:
an imaging unit configured to capture an image,
wherein, in a case where the communication based on the non-Bluetooth low energy communication method by the second communication unit is unavailable, the control unit instructs the first communication unit not to transmit an advertising packet conforming to the Transport Discovery Service specifications, based on that an imaging unit performs image capturing, even if it is set that the communication based on the non-Bluetooth low energy communication method is permitted.

5. The communication apparatus according to claim 1, wherein, in a case where the communication based on the non-Bluetooth low energy communication method by the second communication unit is unavailable, the control unit instructs the first communication unit to transmit an advertising packet conforming to Transport Discovery Service specifications with Transport State Bits set "Temporarily Unavailable", based on that it is set that the communication based on the non-Bluetooth low energy communication method is permitted and that the communication based on the non-Bluetooth low-energy communication method is currently performed with second another communication apparatus, and instructs the first communication unit to transmit an advertising packet conforming to the Transport Discovery Service specifications with Transport State Bits set "OFF", based on that it is set that the communication based on the non-Bluetooth low energy communication method is permitted and that the communication based on the non-Bluetooth low energy communication method is not currently performed with the second another communication apparatus.

6. The communication apparatus according to claim 1, wherein, in a case where the communication based on the non-Bluetooth low energy communication method by the second communication unit is unavailable, the control unit instructs the first communication unit not to transit an advertising packet conforming to the Transport Discovery Service specifications with Transport State Bits set "Temporarily Unavailable", based on that it is set that the communication based on the non-Bluetooth low energy communication method is not permitted and that a user operation is determined to be necessary for performing the communication based on the non-Bluetooth low energy communication method, and instructs the first communication unit to transmit an advertising packet conforming to the Transport Discovery Service specifications, based on that it is set that the communication based on the non-Bluetooth low energy communication method is not permitted and that a user operation is determined to be unnecessary for performing the communication based on the non-Bluetooth low energy communication method and that the communication based on the non-Bluetooth low energy communication method is determined not to be performed within a first predetermined time, and instructs the first communication unit to transmit an advertising packet conforming to the Transport Discovery Service specifications with Transport State Bits set "OFF", based on that it is set that the communication based on the non-Bluetooth low energy communication method is not permitted and that a user operation is determined to be unnecessary for performing the communication based on the non-Bluetooth low energy communication method and that the communication based on said another communication method is determined to be performed within the first predetermined time.

7. The communication apparatus according to claim 1, wherein, in a case where the communication based on the non-Bluetooth low energy communication method by the second communication unit is unavailable, the control unit instructs the first communication unit not to transmit an advertising packet conforming to the Transport Discovery Service specifications, based on that it is set that the communication based on the non-Bluetooth low energy communication method is not permitted and that the communication based on the non-Bluetooth low energy communication method is determined not to be performed within a first predetermined time, instructs the first communication unit to transmit an advertising packet conforming to the Transport Discovery Service specifications with Transport State Bits set "Temporarily Unavailable", based on that it is set that the communication based on the non-Bluetooth low energy communication method is not permitted and that the communication based on the non-Bluetooth low energy communication method is determined to be performed within the first predetermined time and that the communication based on said another communication method is determined not to be performed within a second predetermined time shorter than the first predetermined time, and instructs the first communication unit to transmit an advertising packet conforming to the Transport Discovery Service specifications with Transport State Bits set "OFF", based on that it is set that the communication based on the non-Bluetooth low energy communication method is not permitted and that the communication based on the non-Bluetooth low energy communication method is determined to be performed within the first predetermined time and that the communication based on the non-Bluetooth low energy communication method is determined to be performed within the second predetermined.

8. The communication apparatus according to claim 7, wherein, in a case where an advertising packet in which the value of Transport State Bits is set to "Off" is transmitted by the first communication unit, the second communication unit is supplied with power.

9. The communication apparatus according to claim 1, wherein, in a case where the communication based on the non-Bluetooth low energy communication method by the second communication unit is unavailable, the control unit instructs the first communication unit to transmit an advertising packet conforming to the Transport Discovery Service specifications with Transport State Bits set "ON".

10. The communication apparatus according to claim 9, wherein a case where the communication based on the non-Bluetooth low energy communication method by the second communication unit is available is a case where power is supplied to the second communication unit.

11. The communication apparatus according to claim 1, wherein the non-Bluetooth low energy communication method is a communication method conforming to IEEE 802.11 series.

12. The communication apparatus according to claim 1, wherein a case where the communication based on the non-Bluetooth low energy communication method by the second communication unit is unavailable is a case where power is not supplied to the second communication unit.

13. A method for controlling a communication apparatus including a first communication unit configured to perform communication conforming to Transport Discovery Service specifications via Bluetooth low energy and a second communication unit configured to perform communication based on a non-Bluetooth low energy communication method, the method comprising:
  controlling, in a case the communication based on the non-Bluetooth low energy communication method by the second communication unit is unavailable, instruct the first communication unit not to transmit an advertising packet conforming to the Transport Discovery Service specifications, based on that it is set that the communication based on the non-Bluetooth low energy communication method is not permitted, and instruct the first communication unit to transmit an advertising packet conforming to the Transport Discovery Service specifications with Transport State Bits set "OFF", based on that it is set that the communication based on the non-Bluetooth low energy communication method is permitted;
  establishing, a Bluetooth low energy connection for performing communication based on Bluetooth low energy with first another communication apparatus that has received the advertising packet conforming to the Transport Discovery Service specifications that has been transmitted by the first communication unit in accordance with instruction by the control unit; and
  receiving, from the first another communication apparatus, a request for initiating the communication based on the non-Bluetooth low energy communication method via the Bluetooth low energy connection that has been established.

14. A non-transitory computer-readable storage medium storing a program for causing a computer to execute a method for controlling a communication apparatus including a first communication unit configured to perform communication conforming to Transport Discovery Service specifications via Bluetooth low energy and a second communication unit configured to perform communication based on a non-Bluetooth low energy communication method, the method comprising:
- controlling, in a case where the communication based on the non-Bluetooth low energy communication method by the second communication unit is unavailable, instruct the first communication unit not to transmit an advertising packet conforming to the Transport Discovery Service specifications, based on that it is set that the communication based on the non-Bluetooth low energy communication method is not permitted, and instruct the first communication unit to transmit an advertising packet conforming to the Transport Discovery Service specifications with Transport State Bits set "OFF", based on that it is set that the communication based on the non-Bluetooth low energy communication method is permitted;
- establishing, a Bluetooth low energy connection for performing communication based on Bluetooth low energy with first another communication apparatus that has received the advertising packet conforming to the Transport Discovery Service specifications that has been transmitted by the first communication unit in accordance with instruction by the control unit; and
- receiving, from the first another communication apparatus, a request for initiating the communication based on the non-Bluetooth low energy communication method via the Bluetooth low energy connection that has been established.

* * * * *